United States Patent [19]

Bergsma

[11] Patent Number: 4,960,153

[45] Date of Patent: Oct. 2, 1990

[54] FUEL TANK VAPOR VENT VALVE

[75] Inventor: Rudolph Bergsma, Ann Arbor, Mich.

[73] Assignee: G. T. Products, Inc., Ann Arbor, Mich.

[21] Appl. No.: 431,624

[22] Filed: Nov. 3, 1989

[51] Int. Cl.⁵ ............................................. F16K 51/00
[52] U.S. Cl. .................................. 137/587; 251/144; 285/361
[58] Field of Search ............... 137/315, 351, 587, 588, 137/798; 251/144, 148; 285/208, 209, 210, 360, 361, 376, 396, 401, 402

[56] References Cited

U.S. PATENT DOCUMENTS

| 744,646 | 11/1903 | Tietz | 285/376 X |
|---|---|---|---|
| 2,860,656 | 11/1958 | Eshbaugh | 137/587 X |
| 3,232,644 | 2/1966 | Pfeifer et al. | 285/361 X |
| 3,314,446 | 4/1967 | Saunders | 285/361 X |
| 3,470,524 | 9/1969 | Culver | 285/361 X |
| 4,449,737 | 5/1984 | Specht | 285/360 X |
| 4,546,789 | 10/1985 | Taylor | 285/361 X |
| 4,842,010 | 6/1989 | Edgecomb et al. | 285/360 X |

Primary Examiner—John Rivell
Attorney, Agent, or Firm—Krass & Young

[57] ABSTRACT

A high pressure vapor vent valve for automotive fuel tanks is provided with bayonet-insertion, turn-to-lock locking structure mating with an opening in the fuel tank. An O-ring mounted on the valve body provides a fluid-tight radial compression seal between the valve body and the fuel tank wall to prevent leakage of fuel and fuel vapor therebetween. The O-ring radial compression seal is effected independently of the locking structure.

8 Claims, 3 Drawing Sheets

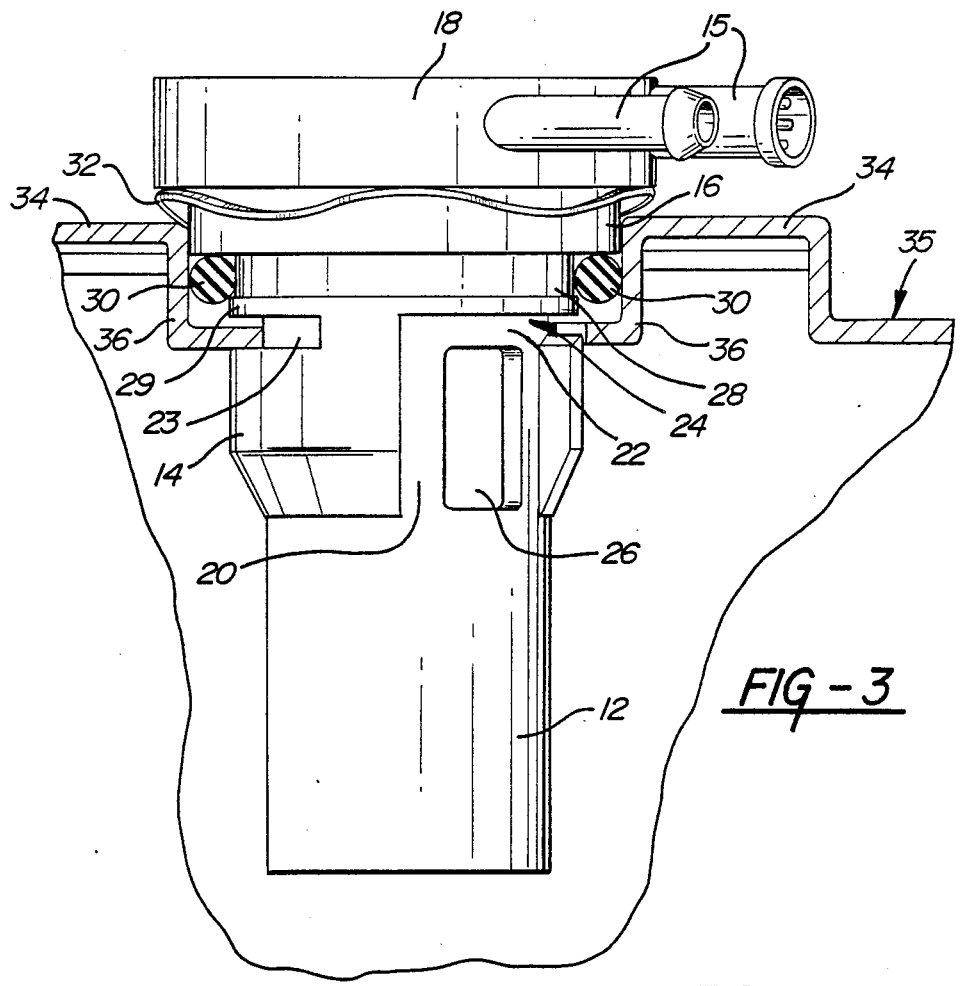
FIG-3
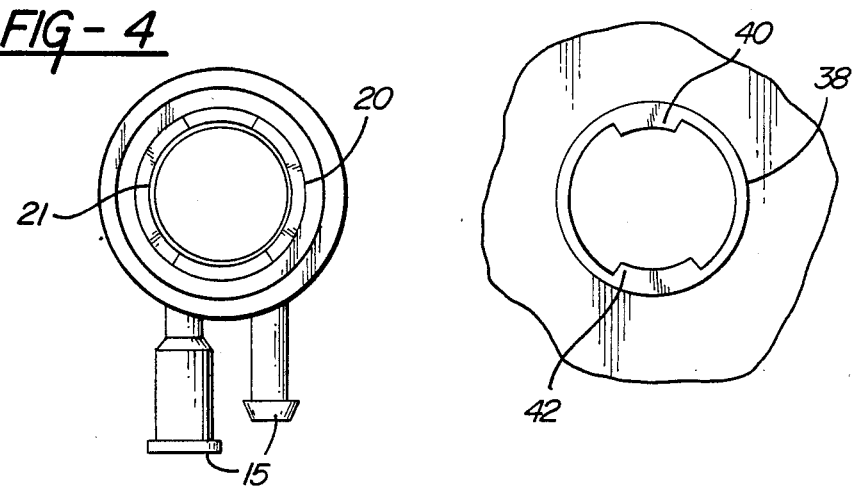
FIG-4
FIG-5

FUEL TANK VAPOR VENT VALVE

Field of the Invention

This invention relates to high pressure vapor vent valves for vehicle fuel tanks, in particular to a vapor vent valve housing which is easily mounted on a fuel tank and which is constructed to provide a reliable seal with the tank structure under widely varying temperature conditions.

Background of the Invention

Vehicle fuel tanks must operate within a wide temperature range; i.e., the tank, its fuel load and tank-mounted accessories become cool when the vehicle sits overnight, and very hot when running under heavy load. Much of the heat is the result of the return of excess fuel from the fuel pump to the tank; i.e., the fuel is heated by proximity to the engine and its various components. The volatile fuel contained in the tank quickly builds up a substantial vapor pressure which can cause problems with filling the tank, and with the integrity of the tank itself. A well-known solution is to provide the tank with a vapor vent valve and a carbon canister to relieve the vapor pressure within the tank and absorb the vented vapors.

In the prior art, the valve housing is typically inserted into a simple hole in the tank wall, the edge or edges of which are crimped back and lined with a resilient grommet or similar sealing material to maintain a seal between the edges of the hole and the valve; i.e., to create a tight seal for preventing unwanted and dangerous leaks of fuel and fuel vapor to the surroundings from between the tank wall and the valve housing.

A problem with this prior art valve mount and seal arrangement is the relatively weak sealing connection between the valve housing and the fuel tank wall. The valve is held in place only by the friction between the grommet seal and the valve body, which allows for substantial axial and rotary motion of the valve with respect to the fuel tank wall. This problem is further aggravated by expansion and contraction of the tank walls due to the aforementioned temperature and pressure changes. Furthermore, the release of fuel and vapor has been known to occur with prior art valves in accidents which affect the structural integrity of the fuel tank walls near the valve mount.

Other problems with the prior art include maintaining consistent grommet quality and tolerances, both of which have an effect on the integrity of the seal between the valve body and the tank wall.

Summary of the Invention

The present invention is accordingly directed to an improved vapor vent valve for vehicle fuel tanks. The valve housing is easily securely, and reliably locked into the tank in a simple operation and maintains a fluid-tight seal between the valve body and the tank wall independent of the locking engagement between the valve and the tank.

The invention comprises a rigid valve housing adapted to be inserted into and matingly received by an opening in the fuel tank wall. The valve body is provided with locking structure which engages portions of the fuel tank wall to provide secure, releasable locking engagement therewith in both axial and rotary directions, positively ensures that the valve cannot inadvertently separate from or move with respect to the tank wall; and, optionally, positively ensures proper installation position or orientation. A fluid-tight seal is maintained between the valve body and the tank wall by a resilient O-ring mounted on the valve body. The O-ring provides a reliable, self-adjusting radial compression seal with the tank wall independent of the locking engagement between the valve and the tank wall.

In an illustrated embodiment, the valve housing locking structure comprises a slot-and-groove, bayonet insertion portion and associated turn-to-lock camming elements to matingly engage with portions of the fuel tank wall. A spring mounted on an upper portion of the valve housing provides an axial biasing force to maintain the valve in position once it has been fully inserted into and locked with the fuel tank wall. The valve is releasably locked into position in the fuel tank with a simple, two-part bayonet-type motion: axial insertion against the spring, and a locking rotation over the camming elements.

The O-ring seal is mounted on the valve body between the locking groove and the axial spring such that a fluid-tight seal is created when the valve is axially inserted into the fuel tank opening. Rotating the valve housing to lock or unlock it from the fuel tank wall has no effect on the O-ring seal; i.e., the O-ring maintains an effective seal with the fuel tank wall independent of the locking structure.

The O-ring is of sufficient radial compliance to maintain the seal regardless of contraction and expansion of the tank wall opening due to temperature and pressure variations in the tank, and is frictionally tight enough on the valve body to stay on during shipping and handling of the valve body. The O-ring is also of sufficient diameter to maintain the axial spring on the upper portion of the valve body.

Overall, the vapor vent valve of the present invention provides a better seal than the prior art grommet-type seals. The seal between the valve body and the opening is less likely to inadvertently be broken, and the valve body itself is less likely to be disengaged from its locked position.

Brief Description of the Illustrated Embodiment

FIG. 3 is a partially-sectioned side section view of the vapor vent valve of FIG. 1 mounted in operative relationship with a vehicle fuel tank;

FIGS. 4 and 5 are end and plan views, respectively, of the FIG. 1 valve and an opening formed in a vehicle fuel tank into which the vapor valve housing is inserted.

Detailed Description of the Illustrated Embodiment

Figure 1:
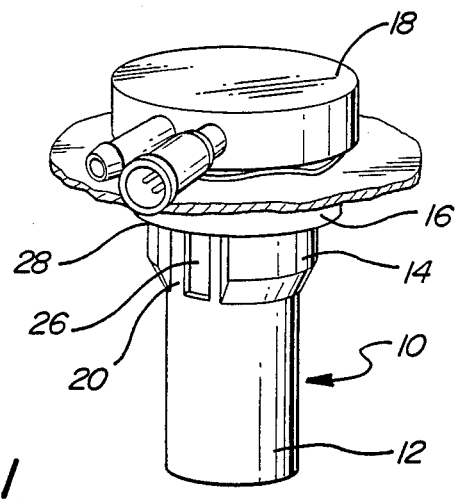
FIG. 1 is a perspective view of a vapor vent valve according to the present invention.
Figure 2:
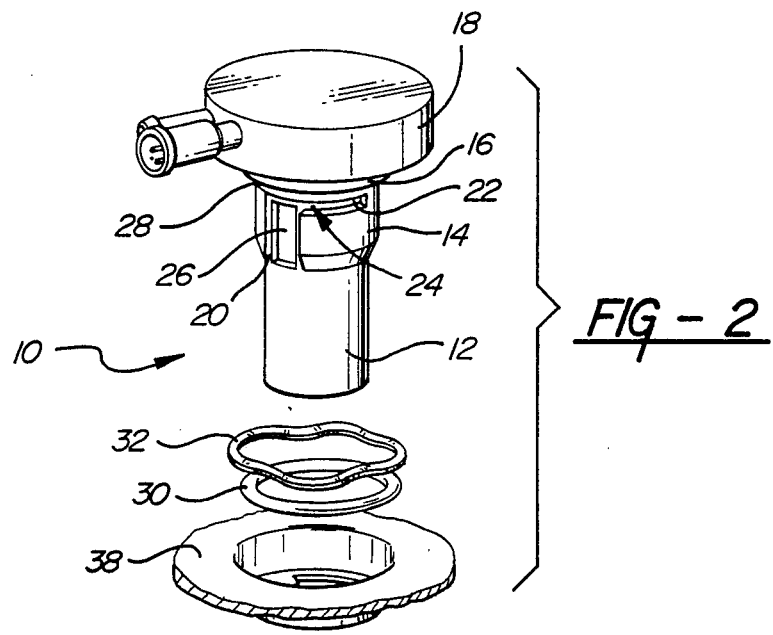
FIG. 2 is an exploded view of FIG. 1.

Referring now to FIGS. 1 through 5, the vapor vent valve of the present invention comprises a hollow valve body or housing 10 having a lower cylindrical portion 12, an intermediate portion 14 having a diameter slightly larger than lower portion 12, a radial shoulder 16 having a diameter slightly larger than that of intermediate body portion 14, and a disc-shaped upper manifold 18 of a diameter greater than shoulder 16. The valve housing 10 is preferably formed of a suitable fuel-resistant plastic such as acetal resin; however, almost any suitable material may be used, such as metal for example.

Intermediate portion 14 has formed therein on opposite sides thereof L-shaped bayonet locking structure comprising longitudinal keyways 20 and 21 and contiguous horizontal, circumferential grooves 22 and 23. A camming element 24 is formed at the entry of each of grooves 22 and 23 at their junction with keyways 20 and 21 as shown. Two radial windows or ports 26 communicating with the hollow interior of portion 12 are formed in opposite sides thereof coincident with and within keyways 20 and 21 for the passage of fuel vapor from the fuel tank through the valve body and the valve structures to the exterior of the tank. The valve which is disposed within housing 10 may be conventional and a suitable valve may be obtained from G.T. Products Company of Ann Arbor, Mich.

A resilient O-ring 30 is removably seated in an annular seat 28 formed in the valve body between body portion 14 and shoulder 16 in a snug friction-fit. The diameter of seat 28 is greater than that of body 14 but slightly smaller than that of the adjacent retainer flange 29 thereby to resist any tendency to strip the O-ring off if and when the valve body is removed from the tank. The axial length of the seat 28 is slightly less than the diameter of the O-ring 30. A sinusoidal circular axial leaf spring 32 having an inner diameter less than the outer diameter of O-ring 30 is loosely held in place between O-ring 30 and manifold 18.

Referring now to FIGS. 3, 4 and 5, the vapor vent valve of the present invention is shown inserted in a recessed opening formed in horizontal top wall 34 of a fuel tank 35. The opening is defined by an interior annular vertical wall 36 depending from wall 34 of the fuel tank, and by a radially inwardly extending flange 38 having two opposed ears 40 and 42 projecting radially inwardly from the lower edge of wall 36. The recessed opening may be formed integrally with the tank wall, such as by stamping or molding when the tank 35 is formed, or may be provided as a separate support collar welded or otherwise fastened in a simple aperture formed in the surface 34 of the fuel tank. Ears 40 and 42 are optionally but preferably of different circumferential dimension thereby to cooperate with similarly different size keyways 20 and 21 in the valve body to limit insertion of the valve body to one orientation; i.e., an orientation in which outlet fittings 15 are properly located.

To mate the valve with the opening, a two-part bayonet-type insertion motion is used. With keyways 20 and 21 aligned with ears 40 and 42, plug portion 12 is axially inserted into the opening until ears 40 and 42 are level or aligned with horizontal grooves 22 and 23 in body portion 14 of the valve. The valve assembly is then rotated such that ears 40 and 42 are cammed over camming elements 24 into horizontal grooves 22.

Resistance to axial insertion of the valve into the opening is first encountered when the inner surface of wall 36 contacts O-ring 30, whose outer diameter is greater than that of the opening. However, due to the resilient nature of the O-ring, the valve body can be forced down into the recess with the O-ring maintaining a snug friction seal with wall 36. O-ring 30 is maintained in position on the valve body by O-ring groove 28.

A fluid-tight seal is created between the valve body and the fuel tank 35 when O-ring 30 is radially compressed by wall 36, and this seal is maintained as long as O-ring 30 and wall 36 are in contact. Axial and rotary movement of the valve body with respect to the fuel tank have no effect on the integrity of the seal unless the O-ring is disengaged from wall 36; i.e., unless the entire valve body is pulled from the fuel tank. Accordingly, a fluid-tight seal exists between the valve and the tank as soon as the valve body is inserted far enough for the O-ring to contact the wall and prior to the valve actually being locked in place.

Before the valve assembly is inserted far enough to align horizontal grooves 22 and 23 with ears 40 and 42 in the opening, axial spring 32 contacts the outer surface of the tank wall 34, presenting substantial axial resistance to further insertion of the valve assembly into the fuel tank. Enough axial insertion force must be applied to at least partially flatten or compress the spring and overcome this resistance to bring horizontal grooves 22 and 23 into alignment with ears 40 and 42. This axial insertion force must be maintained on the valve assembly while rotating the assembly to cam ears 40 and 42 over camming elements 24. Once the ears have been rotated over and past the camming elements, the axial insertion force is released and spring 32 returns to its unstressed position, acting against the surface of the tank wall and manifold 18 to slightly raise the valve body with respect to the tank wall. This effectively forces the ears 40 and 42 down into contact with the lower surfaces of grooves 22 and 23 behind the perpendicular stop portions of the camming elements 24. In this position the valve body is locked into place axially by the force of spring 32 and rotationally by the rear faces or stop portions of camming elements 24.

When locked into the position shown in FIG. 3, resilient O-ring 30 still provides a snug, fluid-tight, radial seal with the recessed opening, and the valve body is prevented from being inadvertently separated or pulled from the tank. It is important to note that the seal formed between the valve body and tank wall by O-ring 030 is entirely radial, the axial position of the O-ring seal with respect to the tank wall being maintained by the previously described longitudinal locking engagement effected by spring 32 between the valve body and the tank wall.

Because the quality of the seal provided by O-ring 30 relies upon the radial compression of the O-ring, the O-ring has an outer diameter at least slightly greater than the inner diameter of the recessed opening. This insures that the O-ring will radially comply with expansion of the opening due to temperature and pressure variations in the metal wall of the fuel tank.

The combination of bayonet insertion, a positive turn-to-lock mechanism, and a radial O-ring compression seal effective independently of the locking mechanism provides an extremely secure, rugged, positive locking engagement between the vent valve and the fuel tank wall. Variations and modifications of the vent valve according to the present invention within the scope of the present claims will be apparent to those skilled in the art. Examples of such changes and modifications include, but are not limited to, differences in materials, size, shape, etc. For example, various types of springs substituted for spring 32, and any number of bayonet locking assemblies and corresponding ears 40, 42 may be used. The O-ring 30 may be solid (as shown) or hollow.

Industrial Applicability

Figure 6:
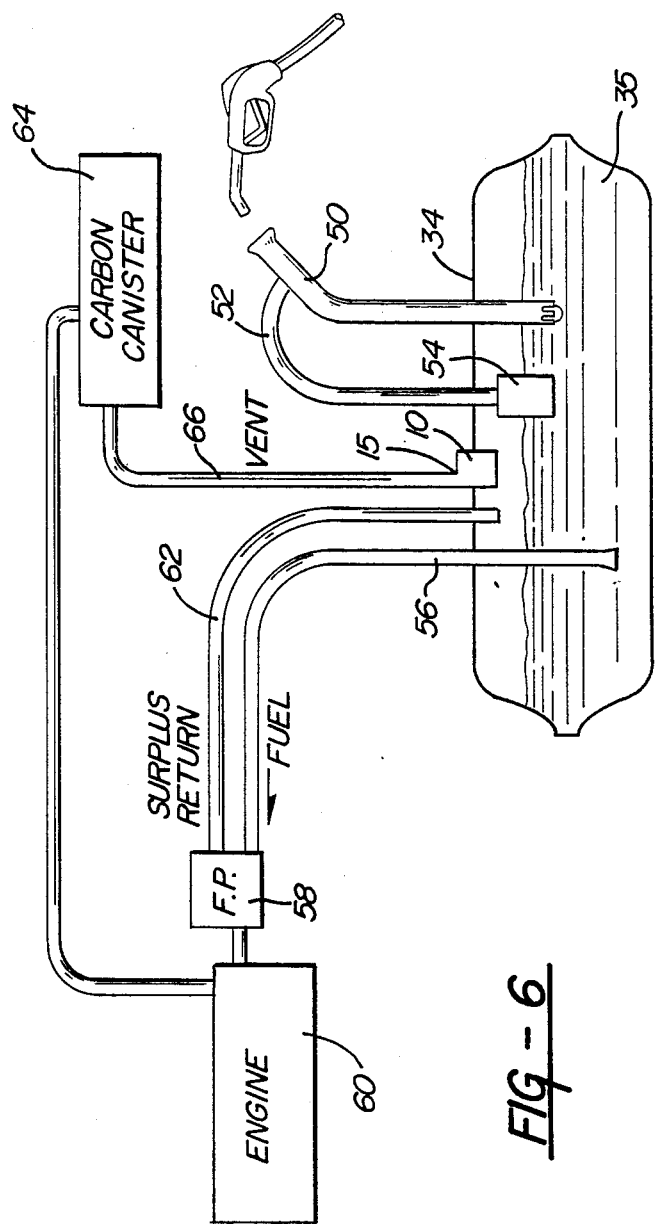
FIG. 6 is a schematic view of a fuel tank/delivery system embodying the invention.

FIG. 6 illustrates an automobile fuel tank/delivery system comprising a tank 35 provided with a filler pipe 50 having an air vent line 52 and a vent valve 54. Fuel is delivered via line 56 to fuel pump 58 thereby to supply engine 60 with appropriate amounts of fuel. Excess is retrieved to the tank via line 62.

Fuel vapors are vented off via valve 10, fitting 15 and line 66 to carbon canister 64. The valve 10 is advantageously constructed in accordance with the present invention. The second fitting 15 is used in systems having high pressure by-pass valves which vent vapors at unusually high pressure; i.e., pressures which could damage the fuel tank.

What is claimed is:

1. A vapor vent valve assembly for removable locking insertion into a corresponding opening in the wall of a vehicle fuel tank, comprising:
   a rigid valve body;
   a locking means on said valve body engaging at least a portion of said opening when said valve body is inserted therein to provide both axial and rotary locking engagement between said valve body and said opening; and
   O-ring seal means on said valve body providing a fluid-tight radial compression seal between said valve body and the tank wall adjacent said opening when said valve body is inserted into said opening; wherein,
   said locking means comprises an axially-acting spring mounted on said valve body, said axial spring engaging the outer surface of said fuel tank wall when said valve body is lockingly engaged with said opening.

2. Apparatus as defined in claim 1 wherein said locking means further comprises bayonet-type cam and groove means formed in said valve body mating with at least a portion of said opening.

3. Apparatus as defined in claim 1 wherein said valve body exhibits at least one axial keyway and a circumferential groove intercepting said keyway to receive a tank opening radial flange therein.

4. Apparatus as defined in claim 1 further including a radial seat for said spring, a retainer seat for the O-ring formed in said valve body axially below said spring seat, said O-ring having an uncompressed outer diameter which is greater than the inner diameter of the spring to retain said spring on the valve body prior to installation.

5. Apparatus as defined in claim 4 wherein the groove is located to require at least partial axial compression of said spring to operatively engage the tank opening flange with said groove.

6. A valve assembly for removable locking insertion into the wall structure surrounding an opening in a vehicle fuel tank comprising:
   a rigid valve body having locking means formed thereon to provide both axial inserting and rotary locking engagement between said valve body and said wall structure;
   O-ring seal means on said valve body providing fluid-tight radial compression seal between said valve body and said opening wall structure when said valve body is axially inserted into said opening; wherein,
   said radial compression seal is effected independent of said locking engagement between said locking means and said opening; and
   means for axially biasing said valve body relative to said tank wall structure in a direction opposing insertion of the valve body into said tank.

7. In combination:
   a vehicle fuel tank having an outer wall, a recess formed in said wall to define an annular tank wall and a radially inwardly directed flange within said recess and defining an opening;
   a valve body longitudinally insertable into and partially through said opening and having at least one longitudinal keyway to accept and clear said flange, and at least one circumferential locking groove into which the flange is insertable by axial rotation of the body;
   said valve body further defining a circumferential O-ring seat parallel, adjacent to and above said groove, and a radial shoulder adjacent and above said seat;
   an O-ring seal on said seat and compressed between said seat and said annular tank wall; and
   an axially acting spring surroundingly disposed on said valve body above said seal to longitudinally bias said valve body relative to said tank wall.

8. Apparatus as defined in claim 7 further including at least one radial port formed in said valve body below said groove.

* * * * *